United States Patent [19]
Nishimura

[11] Patent Number: 5,748,251
[45] Date of Patent: May 5, 1998

[54] APPARATUS WITH A BUILT-IN TELETEXT BROADCASTING DECODER AND TELETEXT DISPLAY ADJUSTMENT APPARATUS

[75] Inventor: Shouichirou Nishimura, Daito, Japan

[73] Assignee: Funai Electric Co., Ltd., Osaka, Japan

[21] Appl. No.: 372,349

[22] Filed: Jan. 13, 1995

[30] Foreign Application Priority Data

Jan. 14, 1994 [JP] Japan .................................. 6-015837

[51] Int. Cl.⁶ .................................................. H04N 5/445
[52] U.S. Cl. .......................... 348/468; 348/563; 348/564; 348/589
[58] Field of Search ....................... 348/468, 465, 348/461, 460, 478, 476, 473, 563, 564, 565, 567, 569, 553, 589, 600, 725, 734; 345/118, 119; H04N 5/445

[56] References Cited

U.S. PATENT DOCUMENTS

| | | | |
|---|---|---|---|
| 5,091,785 | 2/1992 | Canfield et al. | 358/183 |
| 5,138,450 | 8/1992 | Fukuda et al. | 358/147 |
| 5,175,624 | 12/1992 | Hieda et al. | 348/600 |
| 5,233,423 | 8/1993 | Jernigan et al. | 348/564 |
| 5,270,821 | 12/1993 | Samuels | 348/552 |
| 5,298,995 | 3/1994 | Monta et al. | 348/589 |
| 5,373,324 | 12/1994 | Kuroda et al. | 348/468 |
| 5,376,970 | 12/1994 | Amano | 348/569 |
| 5,392,069 | 2/1995 | Koyama et al. | 348/589 |

FOREIGN PATENT DOCUMENTS

| | | | |
|---|---|---|---|
| 63-048978 | 3/1988 | Japan | H04N 5/445 |
| 05183830 | 7/1993 | Japan | H04N 5/445 |
| 05244524 | 9/1993 | Japan | H04N 5/445 |
| 05284438 | 10/1993 | Japan | H04N 5/445 |
| 05336461 | 12/1993 | Japan | H04N 5/445 |

*Primary Examiner*—John K. Peng
*Assistant Examiner*—Nathan J. Flynn
*Attorney, Agent, or Firm*—Bacon & Thomas

[57] ABSTRACT

In an apparatus such as a television set with a built-in teletext broadcasting decoder which displays character data multiplexed with a video signal on the display screen in such a manner that the character data is superposed on the image formed by the video signal, movement instructing data is set to move a character display by teletext broadcasting, and the character display is moved in correspondence to the movement instructing data thus set, so that the position of the character display on the display screen is corrected with ease.

9 Claims, 4 Drawing Sheets

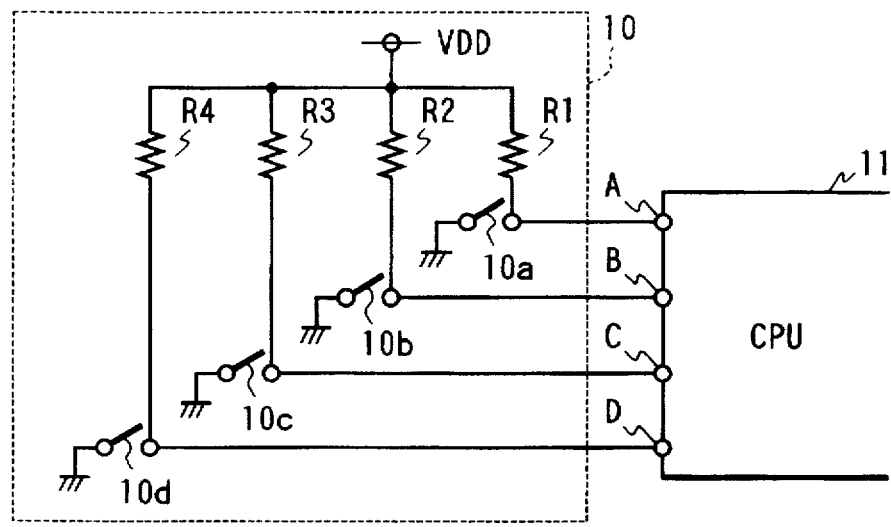

| INPUT PORT A | INPUT PORT B | MOVING OPERATION DATA |
|---|---|---|
| 0 | 0 | BOX POSITION START DATA FOR SHIFTING DISPLAY 10mm LEFT |
| 0 | 1 | BOX POSITION START DATA FOR SHIFTING DISPLAY 5mm LEFT |
| 1 | 0 | BOX POSITION START DATA FOR SHIFTING DISPLAY TO CENTER |
| 1 | 1 | BOX POSITION START DATA FOR SHIFTING DISPLAY 5mm RIGHT |
| INPUT PORT C | INPUT PORT D | MOVING OPERATION DATA |
| 0 | 0 | BOX POSITION START DATA FOR SHIFTING DISPLAY 10mm DOWN |
| 0 | 1 | BOX POSITION START DATA FOR SHIFTING DISPLAY 5mm DOWN |
| 1 | 0 | BOX POSITION START DATA FOR SHIFTING DISPLAY TO CENTER |
| 1 | 1 | BOX POSITION START DATA FOR SHIFTING DISPLAY 5mm UP |

APPARATUS WITH A BUILT-IN TELETEXT BROADCASTING DECODER AND TELETEXT DISPLAY ADJUSTMENT APPARATUS

BACKGROUND OF THE INVENTION

This invention relates to an apparatus, such as a television set, a video tape recorder, and a television set combined with a video tape recorder, which has a built-in teletext broadcasting (including the Closed Caption System) decoder.

FIG. 6 is a block diagram showing the arrangement of a conventional television set with a built-in teletext broadcasting decoder of this type.

In FIG. 6, reference numeral 1 designates an antenna for receiving teletext broadcasting signals; 2, a tuner for selecting a broadcasting signal of a desired channel; 3, a television signal processing section; and 4, a beam deflecting circuit for deflecting the electron beam of a cathode-ray tube (CRT) 5. The television signal processing section 3 includes: an audio amplifier circuit 3a for detecting and amplifying an audio intermediate frequency signal; a video amplifier circuit 3b for detecting and amplifying a video intermediate frequency signal; a horizontal/vertical synchronizing signal forming circuit 3c for forming a horizontal synchronizing signal and a vertical synchronizing signal; and a luminance/color separating circuit 3d for separating a luminance signal and a color signal.

The television set further includes a light receiving unit 6, and a teletext broadcasting signal processing section 7. The light receiving unit 6 is adapted to receive a control signal (of infrared ray) from a remote controller (not shown) to control the operation of the television set. The teletext broadcasting signal processing section 7 includes: a preprocessing circuit 7a for extracting character data from a color television signal provided by the television signal processing section 3; a decoding circuit 7b which decodes the character data thus extracted, and outputs display data; and a screen display control circuit 7c which forms RGB signals and blanking signals corresponding to the character data in synchronization with the horizontal and vertical synchronizing signals provided by the beam deflecting circuit 4, and outputs the formed signals to the television signal processing section 3. Further in FIG. 6, reference numeral 18 designates a system control section which incorporates the above-described teletext broadcasting signal processing section 7 to control the whole system.

The television set thus organized operates as follows:

In the case where, with a desired channel selected with the remote controller, a teletext broadcasting signal is received, the television signal of the channel thus selected is applied through the antenna 1 and the tuner 2 to the television signal processing section 3. In the television signal processing section 3, the video signal is amplified by 4 the video amplifier circuit 3b, while in the teletext broadcasting signal processing section 7, which is a teletext broadcasting decoder, the preprocessing circuit 7a operates to separate character data (hereinafter referred to as "a caption signal", when applicable) multiplexed with the twenty-first (21st) scanning line of the video signal. The caption signal thus separated is decoded by the decoding circuit 7b, the output of which is applied to the screen display control circuit 7c. The screen display control circuit 7c applies RGB signals and blanking signals (BL) corresponding to the character data together with a station selection displaying signal to the television signal processing section 3 in synchronization with the horizontal and vertical synchronizing signals provided by the beam deflecting circuit 4. Thus, the display data is applied to the luminance/color separating circuit 3d in the television signal processing section 3, so that it is displayed on the screen of the cathode-ray tube 5 together with the image.

The conventional television set thus designed suffers from the following difficulties:

In general, a cathode-ray tube having an electron beam deflecting coil assembly is delicately deviated in characteristic depending on the manufacturing process. Hence, in such a cathode-ray tube, the position of a character display by teletext broadcasting on the screen; in other words, the position of a so-called "box display (a rectangular display of white or colored characters in a black background)" on the screen may be shifted. Accordingly, the character display's position thus shifted has been corrected by using semi-fixed resistors (not shown) connected respectively to the horizontal synchronizing signal line and the vertical synchronizing signal line between the beam deflecting circuit 4 and the system control section 18, before the television set is shipped out of the factory. However, the position correcting operation is rather troublesome taking time and labor.

SUMMARY OF THE INVENTION

Accordingly, an object of the invention is to eliminate the above-described difficulty accompanying a conventional apparatus such as a television set in which a teletext broadcasting decoder is built.

More specifically, an object of the invention is to provide an apparatus such as a television set with a built-in teletext broadcasting decoder, which is so improved that the position of a character display on the screen of the cathode-ray tube can be readily adjusted.

To achieve the foregoing object, the invention provides an apparatus with a built-in teletext broadcasting decoder which has a teletext broadcasting signal processing section for displaying character data multiplexed with a video signal in such a manner that the character data is superposed on an image formed by the video signal, the apparatus including: movement-instructing-data setting means for setting movement instructing data to move a position of a character display by teletext broadcasting; and character display moving means for moving the position of the character display by a predetermined amount of movement corresponding to the movement instructing data set by the movement-instructing-data setting means.

BRIEF DESCRIPTION OF THE DRAWINGS

FIG. 2 is a circuit diagram of a position movement specifying circuit in the television set shown in FIG. 1;

FIG. 3 is an explanatory diagram showing a data table including moving operation data which is stored in a memory which is provided in a microcomputer in the television set shown in FIG. 1;

DETAILED DESCRIPTION OF THE PREFERRED EMBODIMENT

Figure 1:
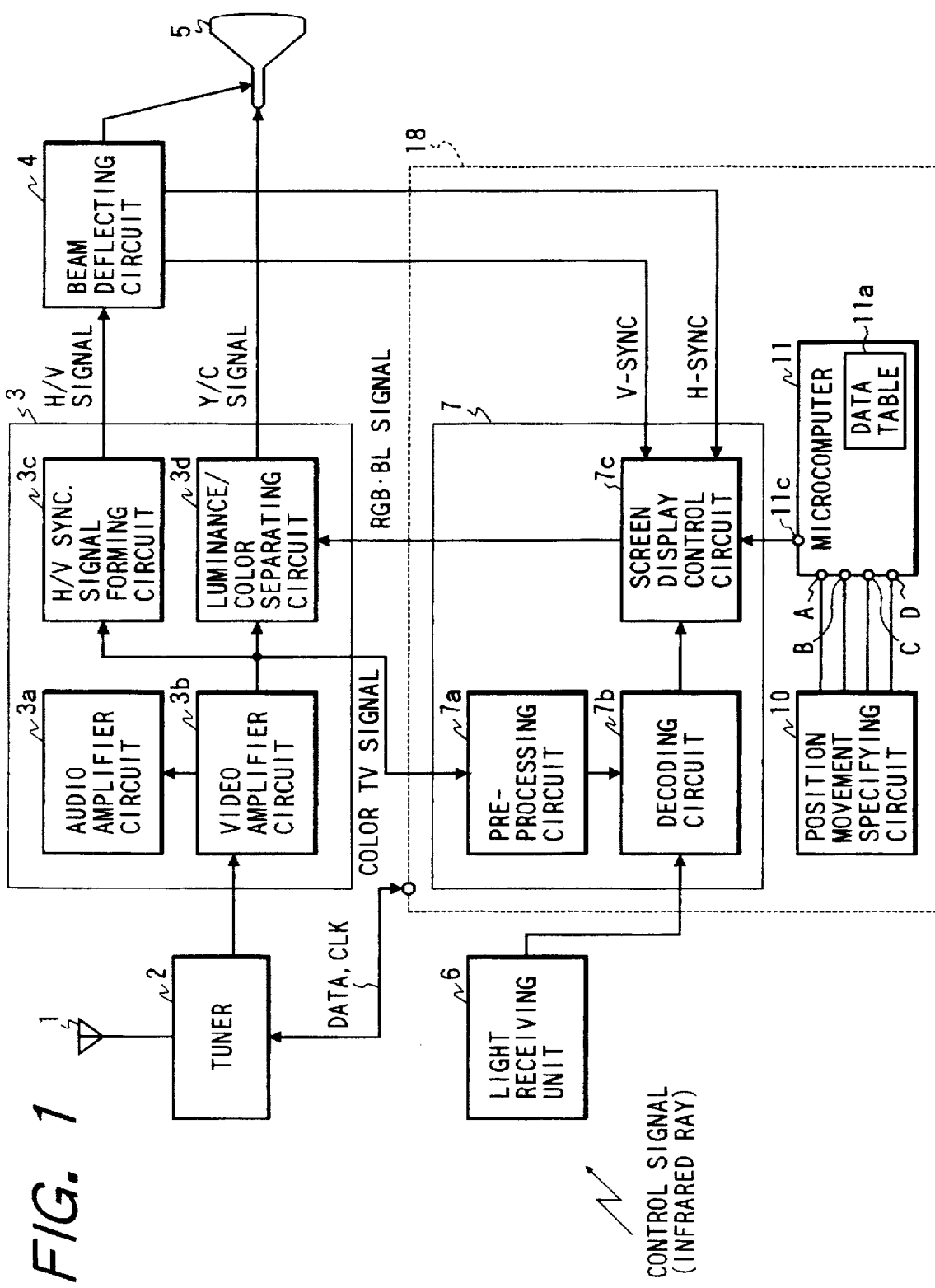
FIG. 1 is a block diagram showing the arrangement of a television set with a built-in teletext broadcasting decoder which constitutes a preferred embodiment of the invention.
Figure 6:
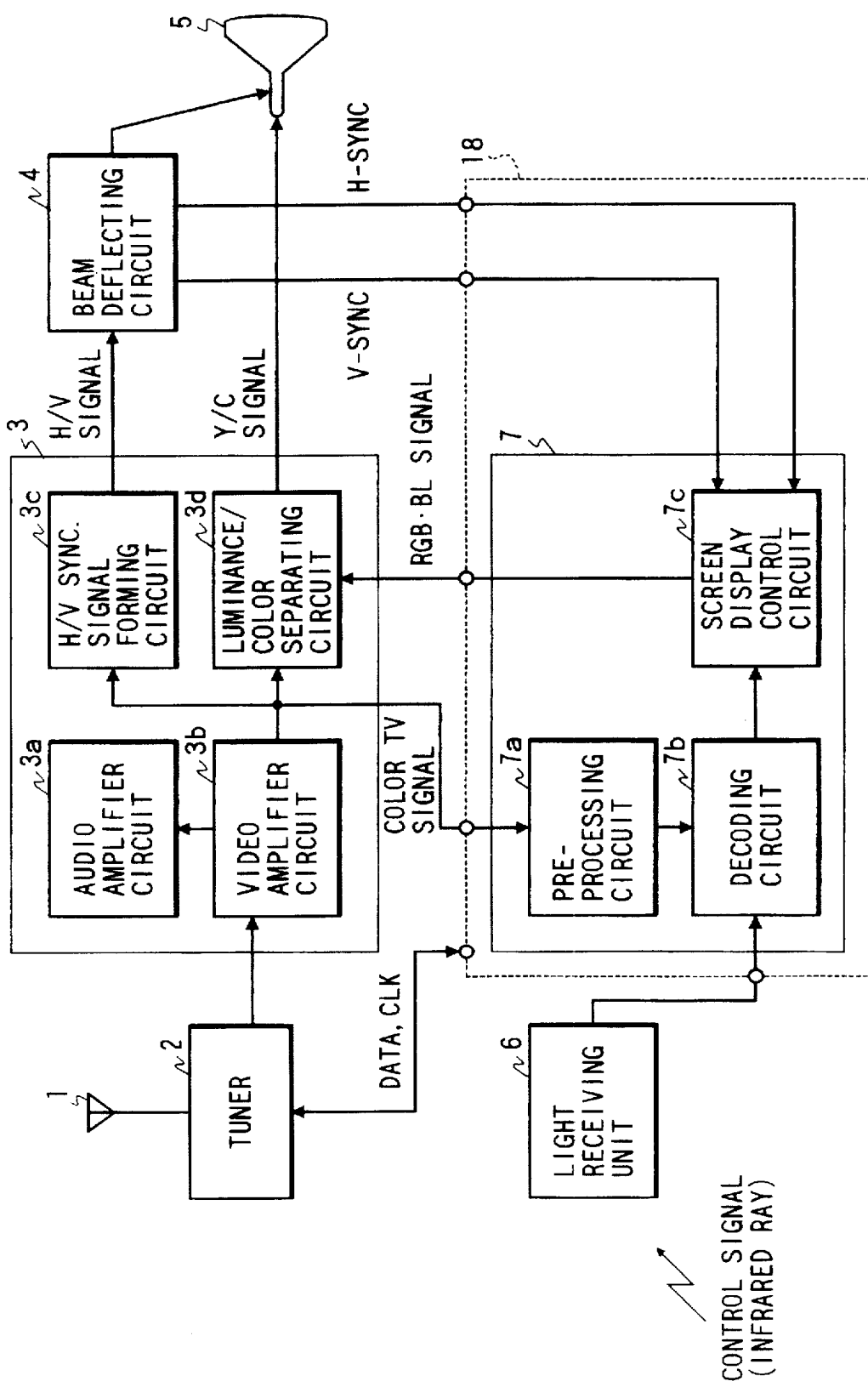
FIG. 6 is a block diagram showing the arrangement of a conventional television set with a built-in teletext broadcasting decoder.

A television set with a built-in teletext broadcasting decoder, which constitutes a preferred embodiment of the invention, is as shown in FIG. 1, in which parts corresponding functionally to those which have been described with reference to FIG. 6 are therefore designated by the same reference numerals or characters.

In FIG. 1, reference numeral 10 designates a movement-instructing-data specifying means, namely, a position movement specifying circuit 10 for specifying the amount of movement of a character display; i.e., a box display on the screen; and 11, a microcomputer.

The position movement specifying circuit 10, as shown in FIG. 2, includes: a first position movement specifying switch 10a connected between an input port A of the microcomputer 11 and ground; a second position movement specifying switch 10b connected between an input port B of the microcomputer 11 and ground; a third position movement specifying switch 10c connected between an input port C of the microcomputer 11 and ground; and a fourth position movement specifying switch 10d connected between an input port D of the microcomputer 11 and ground. The position movement specifying circuit 10 further includes: a pull-up resistor R1 for the input port A of the microcomputer 11; a pull-up resistor R2 for the input port B of the microcomputer 11; a pull-up resistor R3 for the input port C of the microcomputer 11; and a pull-up resistor R4 for the input port D of the microcomputer 11.

FIG. 3 shows the contents of a data table 11a in a memory in the microcomputer 11 which is a character display moving means in which a program has been stored. That is, the memory has stored moving operation data 12a for moving the box display horizontally according to the combinations of "0" and "1" (representing "L" and "H" levels, respectively) which are applied to the input ports A and B of the microcomputer 11, and moving operation data 12b for moving the box display vertically according to the combinations of "0" and "1" which are applied to the input ports C and D of the microcomputer 11.

The amounts of movement of the box display are set in advance according to the screen size of the cathode-ray tube 5. That is, the amounts of movement are approximately 1.5% and 3% of the screen size. In the embodiment, the screen size of the cathode-ray tube 5 is fourteen (14) inches, and therefore the amounts of movement are set to 5 mm and 10 mm.

Now, the adjustment in position of the character display will be described.

Figure 4:
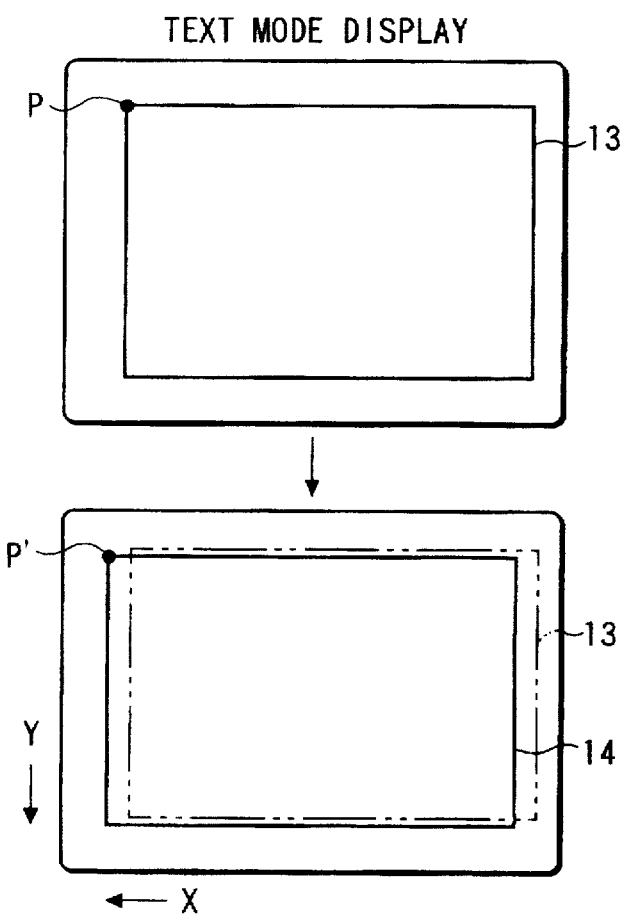
FIG. 4 is an explanatory diagram for a description of the adjustment of the position of a character display on the screen of the cathode-ray tube in the television set shown in FIG. 1.

FIG. 4 shows a text mode display 13 outputted on the screen of the cathode-ray tube 5 by teletext broadcasting. By way of example, the display 13 is shown shifted 10 mm right and 5 mm up from its predetermined correct position. Accordingly, in this case, the position of the display 13 should be so adjusted that the display 13 be shifted 10 mm left and 5 mm down. For this purpose, the first and second position movement specifying switches 10a and 10b are both closed to apply the "0" level to the input ports A and B of the microcomputer 11; and the third position movement specifying switch 10c is closed to apply the "0" level to the input port C of the microcomputer 11, and the fourth position movement specifying switch 10d is opened to apply the "1" level to the input port D of the microcomputer 11.

In response to the "0" level applied to the input ports A and B, the microcomputer 11 refers to the data table 11a to read the moving operation data 12a for movement of the display 10 mm left. The data 12a thus read is box position start data for shifting the display 10 mm left, indicating the amount of movement of the start position P of the box display 13 on the screen of the cathode-ray tube 5 in the direction of X-axis as shown in FIG. 4.

Furthermore, in response to the "0" level applied to the input port C and to the "1" level applied to the input port D, the microcomputer 11 refers to the data table 11a to read the moving operation data 12b for movement of the display 5 mm down. The data 12b thus read is box position start data for shifting the display 5 mm down, indicating the amount of movement of the start position P on the screen of the cathode-ray tube 5 in the direction of Y-axis as shown in FIG. 4.

The microcomputer 11 applies the moving operation data 12a and 12b thus obtained to the screen display control circuit 7c from the output port 11c. The circuit 7c operates on the moving operation data 12a and 12b to move the start position P to a display start position P' of a box display 14 to perform the display as shown in FIG. 4.

Figure 5:
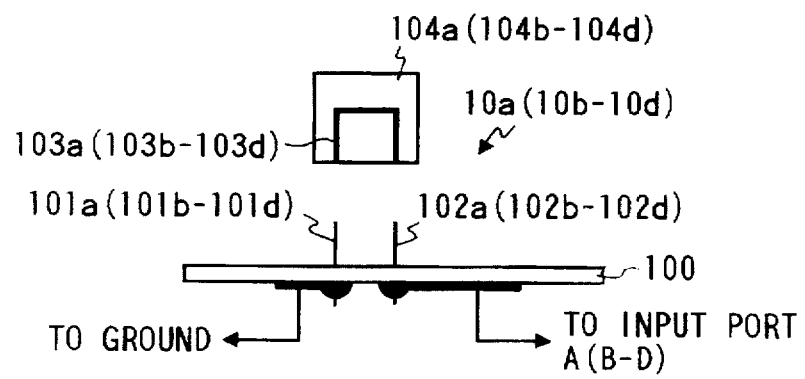
FIG. 5 is an explanatory diagram showing the actual arrangement of switches in the position movement specifying circuit shown in FIG. 2.

In addition, the switch 10a is actually made up of pins 101a and 102a provided on a printed circuit board 100, and a short member 104a including a solder pattern 103a, as shown in FIG. 5. The pin 101a is connected to the ground, and the pin 102a is connected to the input port A. When the short member 104a is mounted on the pins 101a and 102a, the input port A is electrically connected to the ground (the switch 10a is closed) so that the "0" level is applied to the input port A. On the other hand, when the short member 104a is not mounted on the pins 101a and 102a, the switch 10a is opened so that the "1" level is applied to the input port A. Further, the switches 10b through 10d are actually constructed similarly to the switch 10a. That is, the switch 10b is made up of pins 101b and 102b and a short member 104b including a solder pattern 103b; the switch 10c, pins 101c and 102c and a short member 104c including a solder pattern 103c; and the switch 10d, pins 101d and 102d and a short member 104d including a solder pattern 103d.

In the case where the switches 10a through 10d are constructed as described above, if the moving operation data 12a and 12b corresponding to the state that the short members 104a through 104d are not mounted on the pins 101a, 102a through 101d, 102d, namely that the "1" level is applied to the input ports A through D are set to be "BOX POSITION START DATA FOR SHIFTING DISPLAY TO CENTER" respectively, it is not necessary to mount the short members 104a through 104d on the pins 101a, 102a through 101d, 102d to perform the adjusting work for the display position efficiently, when the display position is not required to be shifted.

Thus, as is apparent from the above description, if, in the apparatus of the invention, the character display is shifted on the display screen, then its position can be readily adjusted.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An apparatus with a built-in teletext broadcasting decoder which has a teletext broadcasting signal processing section for displaying character data multiplexed with a video signal in such a manner that the character data is superimposed on an image formed by the video signal, said apparatus comprising:

movement-instruction-data setting means for setting movement instructing data to move the position of a character display of a teletext broadcast by a predetermined amount;

character display moving means for moving the position of the character display by said predetermined amount of movement corresponding to the movement instructing data set by said movement-instructing-data setting means.

2. The apparatus according to claim 1, wherein said movement-instructing-data setting means includes a plurality of switch means.

3. The apparatus according to claim 2, wherein said character display moving means includes a microcomputer, and said plurality of switch means are connected between a plurality of input ports of said microcomputer and ground respectively.

4. The apparatus according to claim 3, wherein said movement-instructing-data setting means further includes a plurality of resistors for pulling up the input ports of said microcomputer when said switch means are turned off.

5. The apparatus according to claim 2, wherein each of said switch means includes two pins and a short member which is to be mounted on said pins to electrically connect said pins to each other.

6. The apparatus according to claim 1, wherein the predetermined amount of movement of the character display position is set in advance according to a screen size.

7. The apparatus according to claim 6, wherein the predetermined amount of movement of the character display position is approximately 1.5% of the screen size.

8. The apparatus according to claim 6, wherein the predetermined amount of movement of the character display position is approximately 3% of the screen size.

9. The apparatus according to claim 1, wherein said character display moving means includes a data table which stores first moving operation data for moving the character display position horizontally by a predetermined amount of movement and second moving operation data for moving the character display position vertically by a predetermined amount of movement.

* * * * *